(12) United States Patent
Sugano et al.

(10) Patent No.: US 7,916,171 B2
(45) Date of Patent: Mar. 29, 2011

(54) CLASSIFICATION APPARATUS FOR SPORT VIDEOS AND METHOD THEREOF

(75) Inventors: Masaru Sugano, Saitama (JP);
 Hiromasa Yanagihara, Saitama (JP);
 Yasuyuki Nakajima, Saitama (JP)

(73) Assignee: KDDI R&D Laboratories, Inc., Kamifukuoka-shi (JP)

( * ) Notice: Subject to any disclaimer, the term of this patent is extended or adjusted under 35 U.S.C. 154(b) by 1300 days.

(21) Appl. No.: 11/068,756

(22) Filed: Mar. 2, 2005

(65) Prior Publication Data
 US 2005/0195331 A1  Sep. 8, 2005

(30) Foreign Application Priority Data
 Mar. 5, 2004  (JP) ................. 2004-062867

(51) Int. Cl.
 *H04N 7/12* (2006.01)
(52) U.S. Cl. ............ 348/157; 348/143; 348/159
(58) Field of Classification Search .......... 348/157, 348/143, 159
 See application file for complete search history.

(56) References Cited

U.S. PATENT DOCUMENTS

| | | | |
|---|---|---|---|
| 5,264,933 A | 11/1993 | Rosser et al. | |
| 5,767,922 A | 6/1998 | Zabih et al. | |
| 5,801,765 A | 9/1998 | Gotoh et al. | |
| 5,809,202 A | 9/1998 | Gotoh et al. | |
| 5,835,163 A | 11/1998 | Liou et al. | |
| 5,959,690 A | 9/1999 | Tobes et al. | |
| 5,990,980 A | 11/1999 | Golin | |
| 6,072,542 A * | 6/2000 | Wilcox et al. | 348/722 |
| 6,078,726 A | 6/2000 | Gotoh et al. | |
| 6,347,114 B1 | 2/2002 | Blanchard | |
| 6,389,168 B2 | 5/2002 | Altunbasak et al. | |
| 6,392,710 B1 | 5/2002 | Gonsalves et al. | |
| 6,449,019 B1 | 9/2002 | Fincher et al. | |
| 6,473,459 B1 | 10/2002 | Sugano et al. | |
| 6,549,643 B1 | 4/2003 | Toklu et al. | |
| 6,597,738 B1 | 7/2003 | Park et al. | |
| 6,606,409 B2 | 8/2003 | Warnick et al. | |
| 6,895,361 B2 | 5/2005 | Yang | |

(Continued)

FOREIGN PATENT DOCUMENTS

JP  06-149902 A  5/1994

(Continued)

OTHER PUBLICATIONS

Alan Hanjalic, "Generic Approach to Highlights Extraction from a Sport Video", ICIP2003, Sep. 14-17, 2003, Barcelona, Spain, vol. I, pp. 1-4.

(Continued)

*Primary Examiner* — Joseph G Ustaris
*Assistant Examiner* — Geepy Pe
(74) *Attorney, Agent, or Firm* — Westerman, Hattori, Daniels & Adrian, LLP

(57) ABSTRACT

The present invention intends to provide a classification apparatus for broadcasted sport videos for classifying various scenes constituting a sport video, depending on the importance level without being limited to any particular sport video by using visual and audio features. A sport video classification processing portion determines and classifies a play scene, a close-up shot and the like using an audio and a color feature extracted from motion picture data. Because the determination of the most frequent color can be changed adaptively for each inputted sport video, it is not necessary to determine any particular color to the most frequent color previously.

1 Claim, 5 Drawing Sheets

U.S. PATENT DOCUMENTS

| | | | |
|---|---|---|---|
| 6,909,745 | B1 | 6/2005 | Puri et al. |
| 7,006,945 | B2 * | 2/2006 | Li ................................. 702/181 |
| 7,035,435 | B2 | 4/2006 | Li et al. |
| 7,042,512 | B2 | 5/2006 | Yang et al. |
| 7,058,130 | B2 | 6/2006 | Liu et al. |
| 7,110,454 | B1 * | 9/2006 | Chakraborty ............ 375/240.16 |
| 2001/0051516 | A1 | 12/2001 | Nakamura et al. |
| 2002/0018594 | A1 | 2/2002 | Xu et al. |
| 2002/0078438 | A1 | 6/2002 | Ashley |
| 2002/0126758 | A1 | 9/2002 | Blanchard |
| 2003/0007555 | A1 | 1/2003 | Divakaran et al. |
| 2003/0067560 | A1 | 4/2003 | Suzuki |
| 2004/0027369 | A1 | 2/2004 | Kellock et al. |
| 2004/0062520 | A1 | 4/2004 | Gutta et al. |
| 2004/0167767 | A1 * | 8/2004 | Xiong et al. ...................... 704/1 |
| 2005/0267740 | A1 | 12/2005 | Abe et al. |
| 2006/0280365 | A1 | 12/2006 | Gong et al. |

FOREIGN PATENT DOCUMENTS

| | | | |
|---|---|---|---|
| JP | 08-339379 | A | 12/1996 |
| JP | 10-224741 | A | 8/1998 |
| JP | 11-55613 | | 2/1999 |
| JP | 11-252509 | A | 9/1999 |
| JP | 2001-69437 | | 3/2001 |
| JP | 2001-251581 | | 9/2001 |
| JP | 2001-258038 | A | 9/2001 |
| JP | 2002-199332 | | 7/2002 |
| JP | 2004-128550 | A | 4/2004 |

OTHER PUBLICATIONS

Ahmet Ekin et al., "Robust Dominant Color Region Detection and Color-Based Applications for Sport Video", ICIP2003, Sep. 14-17, 2003, Barcelona, Spain, vol. I, pp. 21-24.

J. Assfalg et al., "Automatic Extraction and Annotation of Soccer Video Highlights", ICIP2003, Sep. 14-17, 2003, Barcelona, Spain, vol. II, pp. 527-530.

Peng Xu et al., "Algorithms and System for Segmentation and Structure Analysis in Soccer Video", ICME2001, Aug. 22-25, 2001, EP10.04, pp. 928-931.

Riccardo Leonardi et al., "Semantic Indexing of Soccer Audio Visual Sequences", IEEE Translation on Circuits and Systems for Video Technology, vol. 14, No. 5, May 2004, pp. 634-643.

M. van der Schaar et al., "*A Hybrid Temporal-SNR Fine-Granular Scalability for Internet Video*", IEEE Transactions on Circuits and Systems for Video Technology, vol. 11. , No. 3., Mar. 2001, pp. 318-331.

F. Wu et al., "*A Framework for Efficient Progressive Fine Granularity Scalable Video Coding*", IEEE Transactions on Circuits and Systems for Video Technology, vol. 11., No. 3., Mar. 2001, pp. 332-344.

Japanese Office Action dated Aug. 1, 2007, issued in corresponding Japanese patent application No. 2002-285667.

* cited by examiner

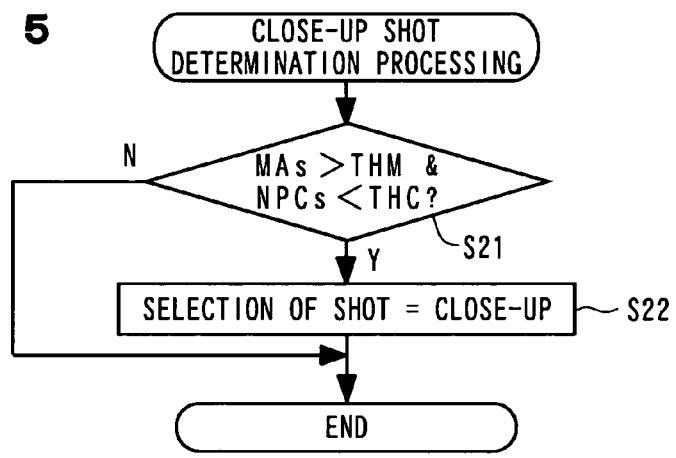
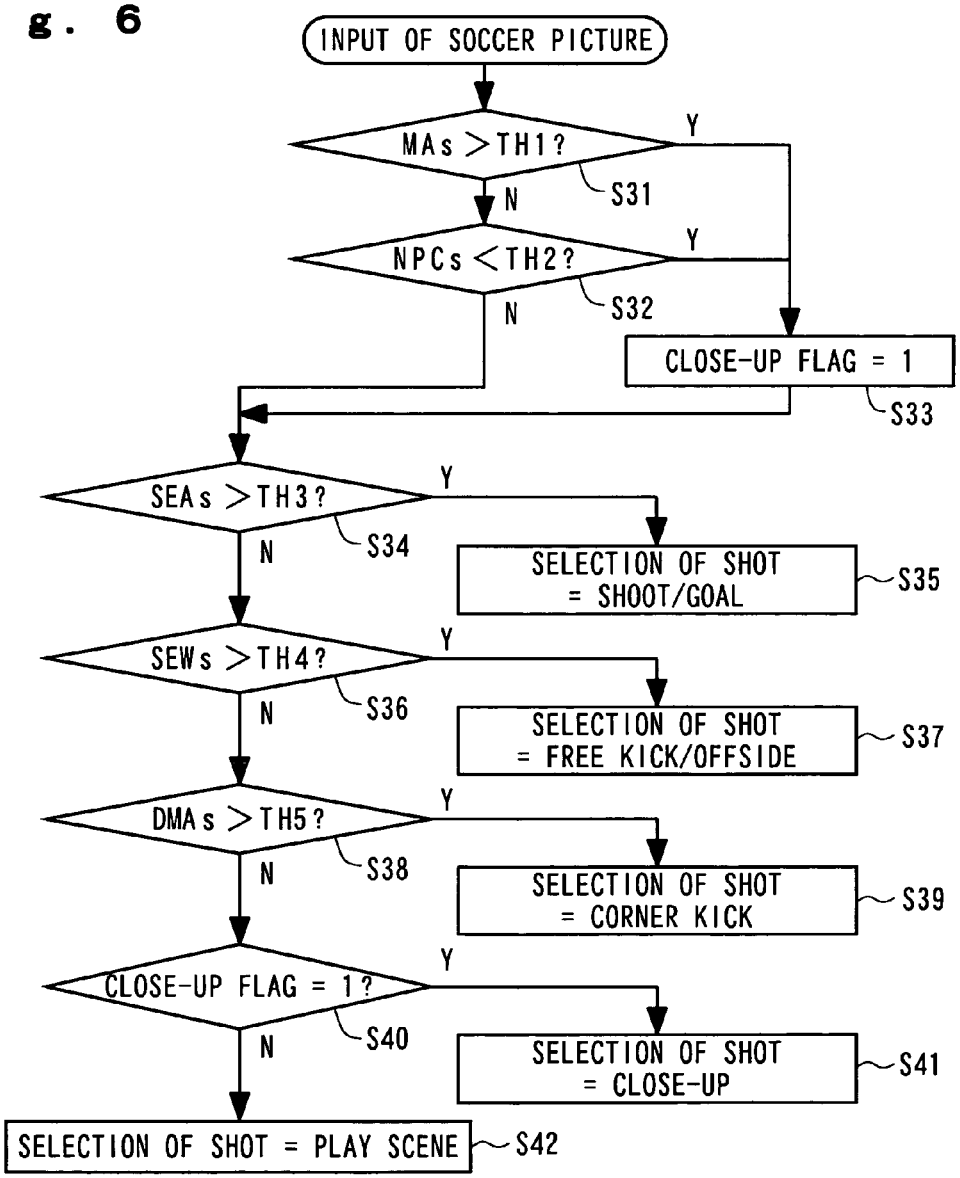

CLASSIFICATION APPARATUS FOR SPORT VIDEOS AND METHOD THEREOF

BACKGROUND OF THE INVENTION

1. Field of the Invention

The present invention relates to a classification apparatus for sport videos and more particularly a classification apparatus for sport videos capable of classifying scenes of sport videos not structured clearly depending on a level of the importance by automatically analyzing the visual features or audio feature of uncompressed or compressed sport video. Further, the invention relates to a classification apparatus for sport videos capable of classifying sport videos into scenes having various levels of importance at low cost and providing effective retrieval and browsing of the sport videos and a method thereof.

2. Description of the Related Art

As for a conventional technology, Japanese Patent Application Laid-Open No. 2002-199332 has disclosed an apparatus for extracting highlights of important events by evaluating the audio level of a sport video. Further, Japanese Patent Application Laid-Open No. 2001-251581 has disclosed an apparatus for extracting a video scene having an importance from sport videos having no clear structure to create video skims by using action index, situation index and importance determination parameter based thereon.

Further, Japanese Patent Application Laid-Open No. 2001-69437 has disclosed an apparatus for retrieving highlight scenes by retrieving an image matching a representative image (reference image) from recorded videos. Additionally, Japanese Patent Application Laid-Open No. 11-55613 has disclosed an apparatus for detecting a goal scene or applause from recorded videos and playing back segments before and after that one as a highlight while fast-forwarding other segments.

Of the conventional technology, the apparatuses disclosed in Japanese Patent Application Laid-Open No. 2002-199332 and Japanese Patent Application Laid-Open No. 11-55613 cannot be applied to detailed scene classification because their objects are to extract a specific event in sport videos accompanying applause and goal scene. Although the apparatus disclosed in Japanese Patent Application Laid-Open No. 2001-251581 can be applied to sport videos having no clear structure, it can be difficult to apply it to general purpose at low computational cost because there are many kinds of indexes to be added and they are complicated and the sport video which can be handled is relatively limited. Further, in the apparatus disclosed in Japanese Patent Application Laid-Open No. 2001-69437, it is difficult to specify any representative image for general purpose. Because the apparatus uses only visual features, there is also a possibility that the highlight which can be retrieved is limited.

SUMMARY OF THE INVENTION

An object of the present invention is to provide a classification apparatus for sport videos for classifying various scenes constituting sport video, provided by broadcasting, depending on the importance level without being limited to any particular sport video by using the visual and audio features.

In order to achieve the object, the present invention is firstly characterized in that a classification apparatus for sport videos provided by broadcasting comprises a shot segmentation means for segmenting motion picture data into shots, a motion information analyzing means for analyzing motion information of the motion picture data, a color information analyzing means for analyzing color information of motion picture data, and a sport video classifying means for classifying sport videos using the motion information and the color information in a video of the motion picture data.

The present invention is secondly characterized in that the classification apparatus for sport videos provided by broadcasting further comprises an audio information analyzing means for analyzing audio information of audio data accompanied by the motion picture data, and a sport video classifying means for classifying sport videos using the motion information, color information and audio information in a video of the motion picture data.

The present invention thirdly characterized in that a classification method for sport videos provided by broadcasting comprises determining the sport video to be a shot or scene having a highest importance, if energy indicating the characteristic of applause is larger than a first predetermined threshold value, determining that sport video to be a shot or scene having a next highest importance, if a difference in motion activity between adjoining two shots is larger than a second predetermined threshold value, and determining that sport video to be a shot or scene having a further next highest importance, if energy indicating the characteristic of applause is smaller than the first threshold value while the difference in motion activity is smaller than the second threshold value.

According to the invention, the sport videos provided by broadcasting can be classified to various scenes depending on the importance level. Consequently, highlight constituted of highly important scenes can be browsed in a short time and any particular event can be retrieved.

BRIEF DESCRIPTION OF THE DRAWINGS

FIG. 5 is a flow chart showing the processing of a close-up shot determination portion.

FIG. 6 is a flow chart showing other embodiment of the sport video classification processing portion.

DETAILED DESCRIPTION OF THE PREFERRED EMBODIMENTS

Figure 1:
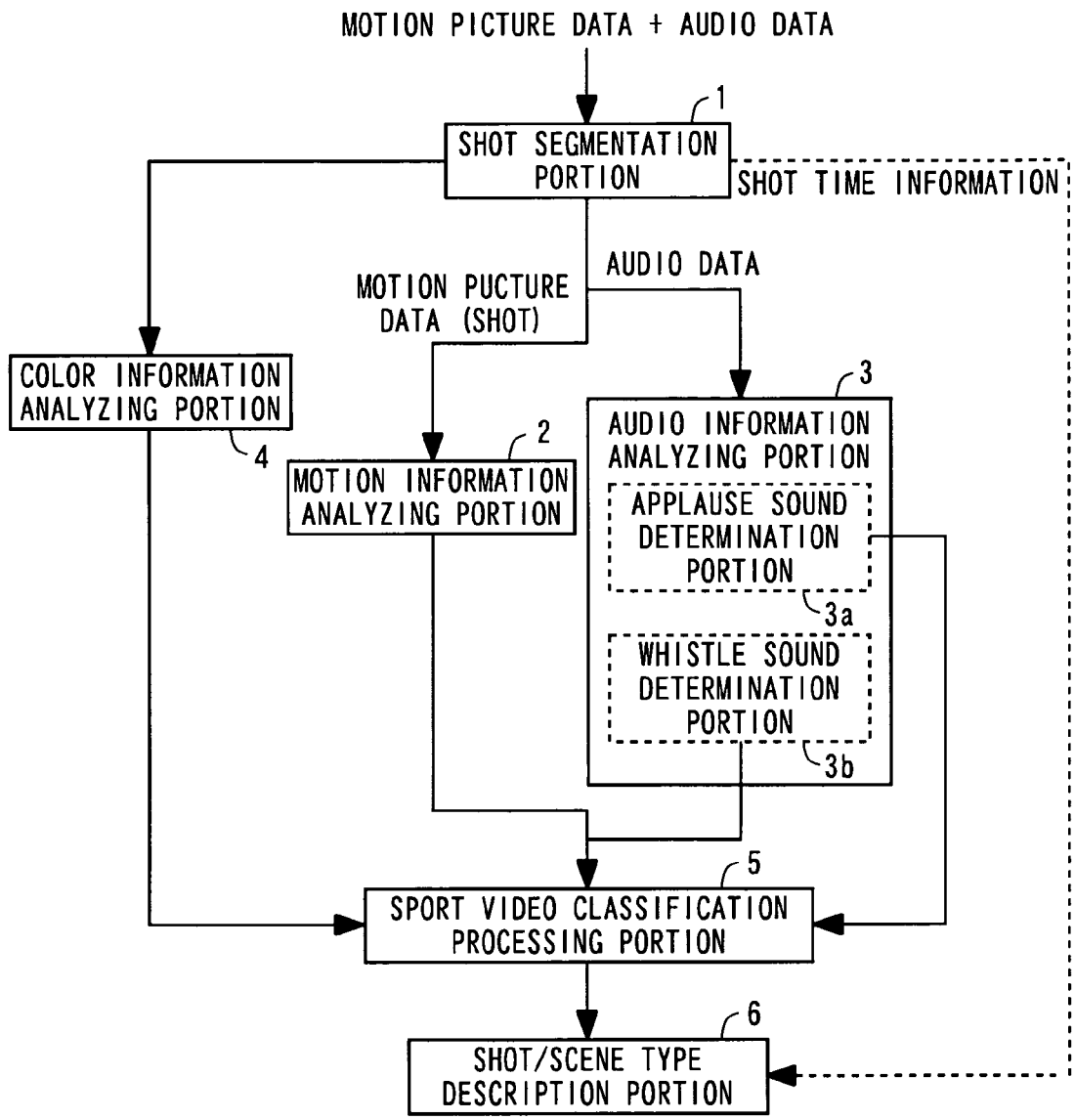
FIG. 1 is a block diagram showing an embodiment of the present invention.

Hereinafter, the invention will be described in detail with reference to the accompanying drawings. FIG. 1 is a structure diagram of a classification apparatus for sport videos according to an embodiment of the invention.

First, uncompressed or compressed motion picture is segmented into shot units by a shot segmentation portion 1. Next, motion information is analyzed from motion picture data of a shot by a motion information analyzing portion 2 and in parallel, audio information is extracted and analyzed from accompanying audio data by an audio information analyzing portion 3. The audio information analyzing portion 3 contains an applause sound determination portion 3a and a whistle sound determination portion 3b. Further, the color information analyzing portion 4 extracts color information of shot.

The motion information obtained by the motion information analyzing portion 2, the audio information obtained by the audio information analyzing portion 3 such as applause sound and whistle sound and the color information obtained by the color information analyzing portion 4 are sent to a sport video classification processing portion 5. If a target sport is soccer, the sport video classification processing portion 5 carries out video classification processing for a goal/shoot scene, a free kick/offside scene, a corner kick scene, a play scene, a close-up scene and the like in the order of importance level using said information pieces. Next, a shot/scene type description portion 6 describes a shot scene type by adding shot time information.

Figure 2:
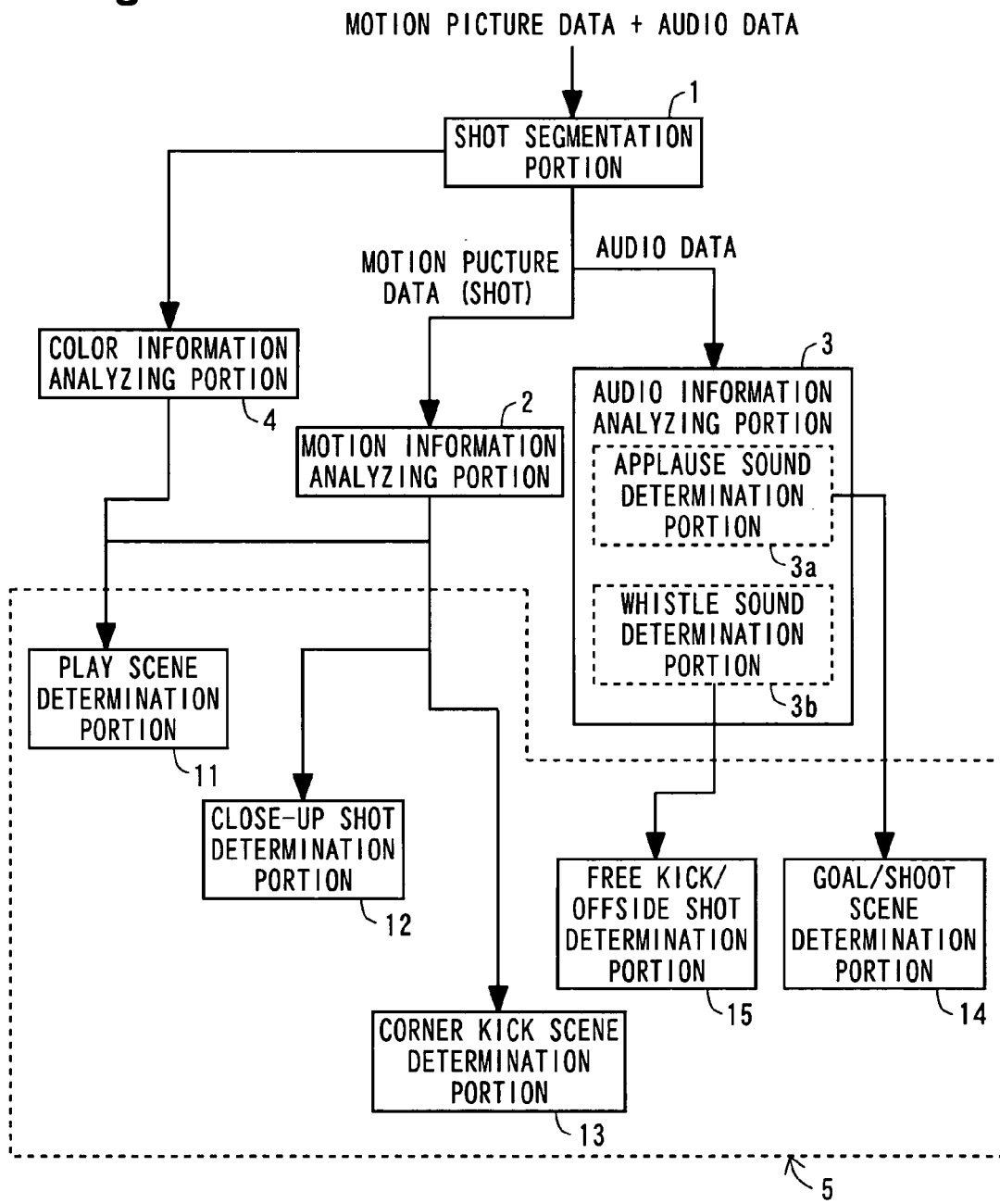
FIG. 2 is a diagram showing an embodiment of sport video classification processing portion.

Next, the processing of an embodiment of the sport video classification processing portion 5 will be described in detail with reference to FIG. 2. Although soccer will be explained as an example of the sport video, the invention is not restricted to this example. In FIG. 2, like reference numerals are attached to the same components as or similar ones to FIG. 1.

The sport video classification processing portion 5 comprises a play scene determination portion 11, a close-up shot determination portion 12, a corner kick scene determination portion 13, a goal/shoot scene determination portion 14 and a free kick/offside shot determination portion 15.

The color information analyzing portion 4 extracts a representative frame from the shot and color information from a downscaled (or reduced sized) image. As the representative frame in the shot, a key frame extracted by the apparatus or method disclosed in U.S. Patent Application Publication No. US 2001/0016007, an image at the beginning of the shot or the like can be used.

As the downscaled image from which the color information is to be extracted, an image constituted of the DC components of DCT coefficient can be used, if the sport video is compressed motion picture data.

Figure 3:
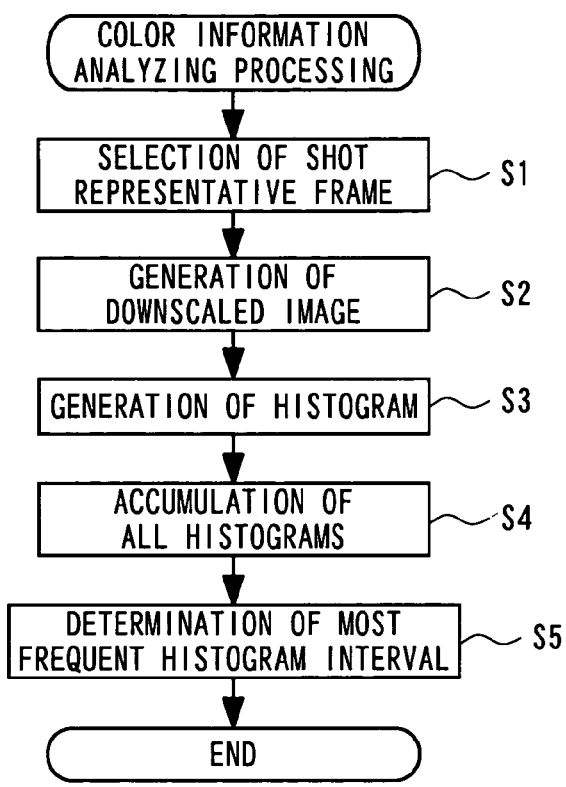
FIG. 3 is a flow chart showing the processing of a color information analysis processing portion.

FIG. 3 shows the processing flow of the color information analyzing portion 4. In step S1, a shot representative frame is selected and in step S2, a downscaled image is generated from the shot representative frame. Next, in step S3, a histogram is created and in step S4, all histograms are accumulated.

As the color information extracted from the downscaled picture, it is possible to use the color layout descriptor defined in MPEG-7 and the color histogram of RGB components or luminance/chrominance components. Although any size, for example, 32×32 pixels, 16×16 pixels can be selected, if the color histogram is used, it is preferable to compute the histogram of luminance/chrominance components from a region of 8×8 pixels considering a tradeoff between processing load required for computation of the histogram and the accuracy for color determination.

After all the histograms are accumulated in the above-described manner, the procedure proceeds to step S5, in which the most frequent histogram interval is determined. For example, by computing the histogram of luminance/chrominance components in the downscaled image of 8×8 about the representative frame of all the shots and accumulating these results, it is possible to determine that the value of luminance/chrominance components belonging to the largest respective histogram interval(bin) is the most frequent color in a picture. At this time, the arbitrary width of the histogram interval can be specified.

Figure 4:
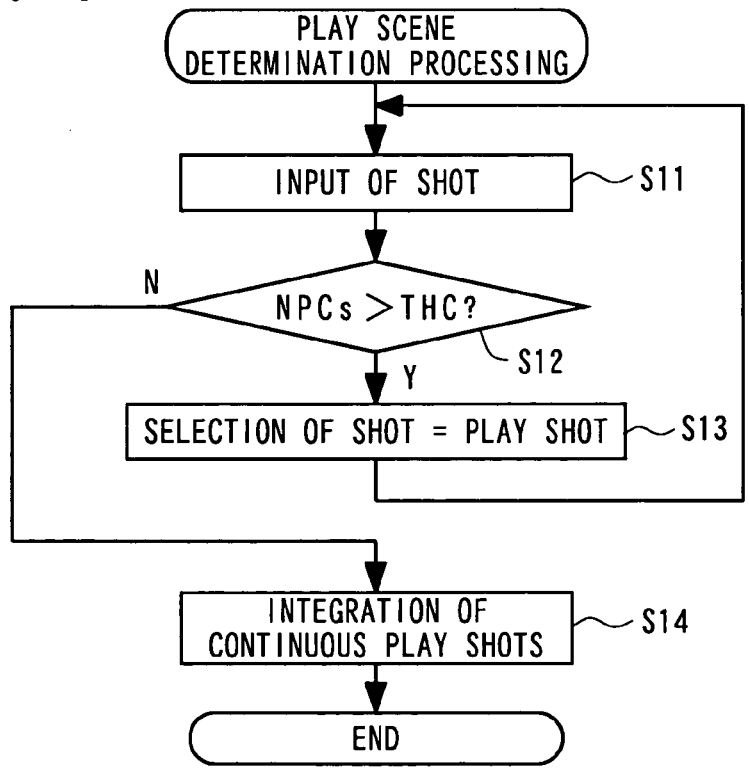
FIG. 4 is a flow chart showing the processing of a play scene determination portion.

Next, the processing of the play scene determination portion 11 in FIG. 2 will be described with reference to FIG. 4. FIG. 4 is a flow chart showing the operation of the play scene determination portion 11. Because generally, while no important event exists, the flow of a play (offensive action) is often captured with a camera zoomed out, thus an image in which the grass color in a soccer field is dominant frequently appears. Therefore, when the color information extracted from the representative frame of a shot is evaluated, a shot in which the most frequently appearing color (most frequent color, the grass color in this case) is dominant is determined to be a shot having relatively low importance. Further, the importance of a sport video can be determined depending on the ratio by which the most frequent color occupies the screen.

After the most frequent color is determined by the color information analyzing portion 4 in FIG. 2, the play scene determination portion 11 executes a processing for detecting the shot in which the most frequent color is dominant. First, in step S11, the pixel values of all the representative frames throughout an input sport video are reevaluated. Next, if in step S12, a number of pixels NPCs having a value corresponding to the most frequent color exceeds a certain threshold THC (for example, 24) (NPCs>THC), the procedure proceeds to step S13, in which a shot corresponding to the given representative frame is determined to be a shot during an offensive play and a segment in which this shot continues is determined to be "play shot" belonging to a play scene. Because the most frequent color may change accordingly for each input sport video by the processing in FIGS. 3, 4, no specific color needs to be determined as the most frequent color previously. Therefore, that processing is not restricted to any specific sport but is generally applicable to other sport videos.

As a result of the processes of the steps S11-S13, if sport broadcasting is carried out from a grass tennis court, an artificial turf baseball ground or golf course, the most frequent color becomes green and in case of broadcasting of basketball, the color of its floor becomes the most frequent color. In case of broadcasting of swimming or boat race, the most frequent color is water color.

When the determination of the step S12 turns to negative, it is determined that a sequence of the play shots ends and the procedure proceeds to step S14. In step S14, successive play shots are integrated.

Next, the processing of the close-up shot determination processing portion 12 in FIG. 2 is shown in the flow chart of FIG. 5. Because in sport videos, often a player or a referee is taken in close-up during an interruption of play, these close-up shots during the interruption of play can be determined to be relatively low in importance level.

To determine the close-up shot, the motion distribution of images in a shot is evaluated. Although as the criterion for evaluating the motion distribution in the images, the motion intensity attribute of a motion activity descriptor defined in MPEG-7 can be used. Other methods can also be used. That is, the size of motion vector obtained from a motion predicted frame in the shot is averaged and the size of such averaged motion vector is averaged in the shot so as to obtain an averaged motion activity MAs in the shot. Then, as the motion information, the motion activity averaged in the shot can be used.

In step S21, the value of the motion activity MAs is evaluated and if this exceeds a certain threshold THM (for example, an average value in the inputted soccer video), it is determined that it indicates a close-up shot of the step 22. Because the zoom shot of a player on the grass or court may be mistakenly detected, if by using the processing for determining an image in which the most frequent color is dominant, a close-up shot of step S22 is determined in a condition that the motion activity MAs is larger than the threshold THM and further the most frequent color is not dominant in the image, that is, NPCs<THC, the close-up shot can be detected more accurately.

Because as a more detailed classification of the sport video, it can be considered that in offensive activity, the camera is panned in an offending direction, after the offending activity is discriminated by detecting a shot in which the most frequent color is dominant, the offending direction can be determined using motion information. As the evaluation criteria used at this time, the consistency of motion direction can be selected and the dominant direction attribute of the motion activity descriptor defined in the MPEG-7 can be used. However, here, by classifying motion vectors existing within the image into arbitrary number of directions as shown in a following equation, the evaluation criteria can be defined by the ratio by which the dominant direction occupies all motion vectors. This corresponds to the operation of the corner kick scene determination portion 13 of FIG. 2.

Consistency of motion direction=number of motion vectors matching the dominant direction/total number of motion vector Next, the processing of the goal/shoot scene determination portion 14 of FIG. 2 will be described. A goal scene and shoot scene are important shots in meaning viewpoint and these scenes can be determined by detecting applause with the applause sound determination portion 3*a* of the audio information analyzing portion 3. The detection of the applause can be carried out by evaluating audio sub-band energy in a shot.

The free kick/offside shot determination portion 15 of FIG. 2 can determine or classify free kick, infringement, or offside by detecting a whistle sound with the whistle sound determination portion 3*a* of the audio information analyzing portion 3. The whistle sound can be detected by limiting an objective sub-band (for example, $6^{th}$-$7^{th}$ sub-bands of 32 sub-bands in MPEG audio data) used in audio sub-band energy computation.

Next, other embodiment of the sport video classification processing portion 5 will be described with reference to the flow chart of FIG. 6. This embodiment judges a play scene, a close-up shot, a corner kick scene, a goal/shoot scene and a free kick/offside shot systematically.

When a soccer video compressed by MPEG is inputted, in step S31, the motion activity obtained from motion vector contained in the compressed data is evaluated. That is, whether or not the motion activity MAs in a shot exceeds a certain threshold TH1 (for example, an average value in inputted soccer video) (MAs>TH1) is determined and if this determination is positive, the procedure proceeds to step S33, in which that shot is determined as a candidate for a close-up shot, that is, "close-up flag" is set to 1.

Next, the most frequent color is analyzed for a shot not selected as a candidate using the luminance/chrominance histogram introduced from computation of the representative frame of the shot reduced to 8×8 pixels in step S32 and if the pixel number NPCs having the most frequent color is smaller than the threshold TH2 (for example, 24) (NPCs<TH2), the procedure proceeds to step S33, in which a corresponding shot is selected as the candidate for close-up shot.

After step S33, a following procedure is carried out for the candidate for a close-up shot or a candidate for a non-close-up shot. In step S34, audio sub-band energy in a shot is evaluated and if a sum of sub-band energies SEAs indicating the characteristic of applause is larger than a certain threshold TH3 (for example, average value in inputted soccer video+0.01) (SEAs>TH3), the procedure proceeds to step S35, in which it is determined to be a shoot or goal shot. At this time, by combining arbitrary number of shots before and after, it is regarded as a shoot or goal scene.

Next, in step S36, a shot whose sum of sub-band energies SEWs indicating the characteristic of whistle is larger than a certain threshold TH4 (for example, average value in inputted soccer video×2) (SEWs>TH4) is extracted from a shot group excluding shoot/goal scenes and in step S37, it is determined to be a free kick/offside shot.

Further, as for the motion activity, if in step S38, a difference DMAs in motion activity between adjoining two shots is larger than a certain threshold TH5 (for example, 35) (DMAs>TH5), in step S39, it is determined that shot transition from a close-up shot to a zoom-out shot exists and this shot group is regarded as a corner kick scene. Because in case of a soccer video, for a corner kick scene, shot transition from close-up of a player kicking ball to zoom-out shot capturing around a goal area is frequently used, a corner kick scene having a relatively high importance can be detected through the processes in step S38, S39.

After the above-described processing ends, of shots not classified as a shoot/goal scene, a free kick/offside shot, a corner kick scene, the candidate for a close-up shot is determined to be a close-up shot and the candidate for a non close-up shot is determined to be a play (offensive) scene. That is, in step S40, a shot of close-up flag=1 is determined to be the close-up shot in step S41, while a shot whose close-up flag is not 1 is determined to a play scene in step S42.

According to the above-described embodiment, various scenes constituting sport videos such as a soccer video can be classified depending on the importance level.

Figure 7:
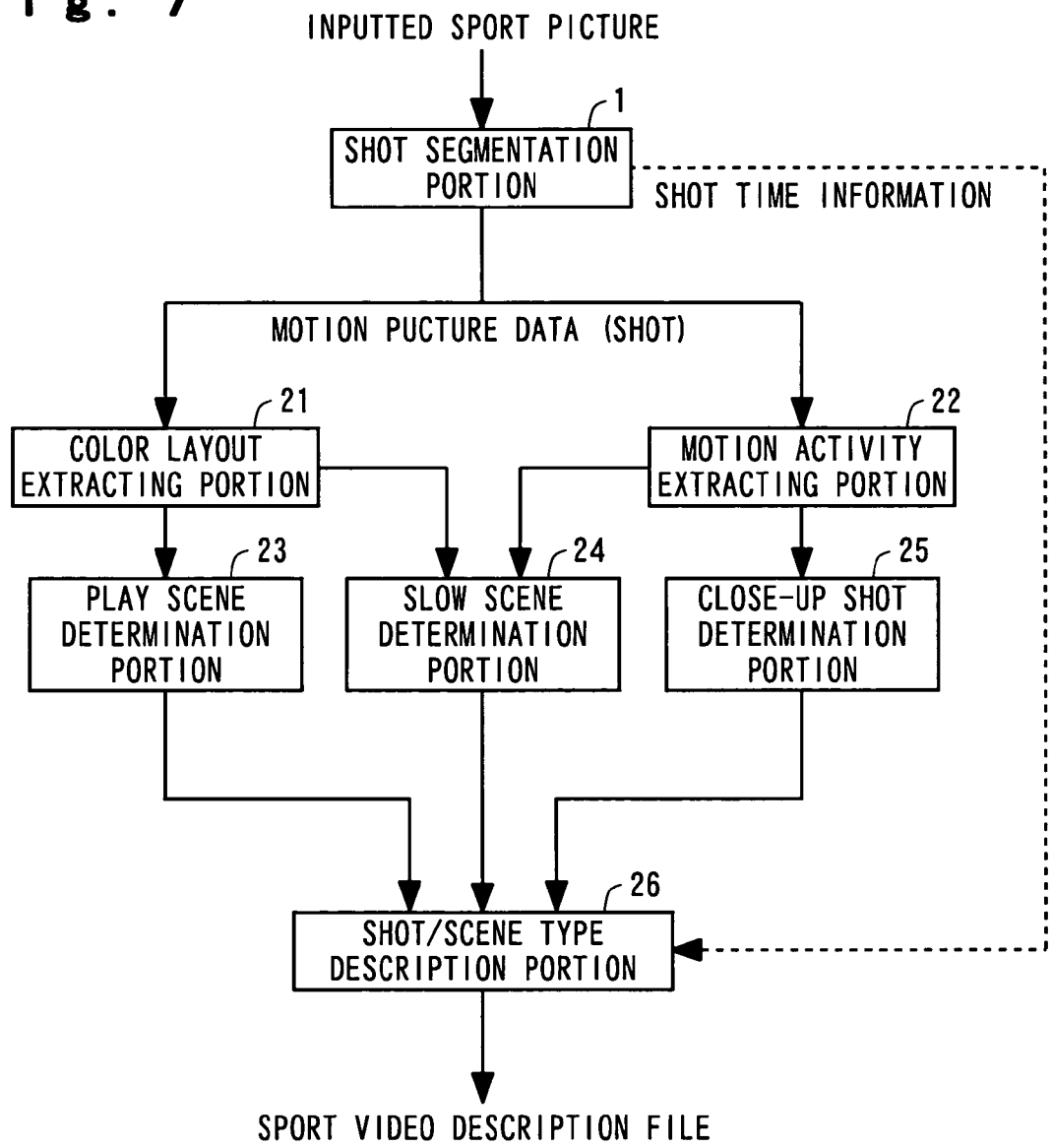
FIG. 7 is a block diagram showing the structure of the second embodiment of the invention.

Next, the second embodiment of the invention will be described with reference to FIG. 7. FIG. 7 is a structure diagram of an apparatus preferable for classifying such sport videos as tennis and baseball.

This embodiment further comprises a play scene determination portion 23 for determining based on the color layout descriptor defined in MPEG-7, based on color layout information obtained from a color layout extracting portion 21 and a close-up shot determining means 25 for determining based on a motion activity obtained from the motion activity extracting portion 22. Then, the sport video is classified into the play scene and other scenes, (i.e. close-up shots) using the play scene determination portion 23 and the close-up shot determination portion 25. The color layout descriptor can be extracted from the representative frame of shots like the above-described example.

Further, in case of a sport video, because an important play is replayed in the form of a slow scene, a slow scene determination portion 24 determines the slow scene. The slow scene determination portion 24 can be achieved using, for example, the apparatus disclosed in the U.S. Patent Application Publication No. US 2004/223052 filed by this inventor. As a result of the above-described determination processing, the sport videos can be classified in more detail.

A shot scene type describing portion 26 labels each shot and scene classified into the above-described way according to a signal from each determining portion. For example, the shot type and/or the scene type are labeled as well as time information using a description format, such as MPEG-7 and that result can be outputted as a sport video description file.

What is claimed is:

1. A classification method for broadcasted sport videos in which the sport video is a soccer video that is captured by a camera, comprising: determining whether motion activity in a shot captured by the camera exceeds a first predetermined threshold value; setting an indicator that the shot is a candidate for a close-up shot in response to determining that the motion activity in the shot exceeds the first predetermined threshold value; determining a most frequent color in the shot in response to determining that the motion activity in the shot does not exceed the first predetermined threshold value; setting an indicator that the shot is a candidate for the close-up shot in response to determining that a number of pixels corresponding to the most frequent color in the shot is smaller than a second predetermined threshold value; determining whether energy indicating a characteristic of applause detected by an audio information analyzing portion is larger than a third predetermined threshold value; determining that the shot is a shot or scene of a goal or shoot in response to determining that the detected energy indicating the characteristic of the applause is larger than the third predetermined threshold value; determining whether energy indicating a characteristic of a whistle is larger than a fourth predetermined threshold value in response to determining that the detected energy indicating the characteristic of the applause is not larger than the third predetermined threshold value; determining that the shot is a shot of a free kick or offside in response to determining that the energy indicating the characteristic of the whistle is larger than the fourth predetermined threshold value; determining whether motion activity between adjoining two shots is larger than a fifth predetermined threshold value in response to determining that the energy indicating the characteristic of the whistle is not larger than the fourth predetermined threshold value; determining the shot to be in a corner kick scene in response to determining that the difference in motion activity between the adjoining two shots is larger than the fifth predetermined threshold value; determining whether the indicator indicates that the shot is the candidate for the close-up shot in response to determining that the difference in motion activity between the adjoining two shots is not larger than the fifth predetermined threshold value; determining that the shot is the close up shot in response to determining that the indicator indicates that the shot is the candidate for a close-up shot; and determining that the shot is a shot of a play scene in response to determining that the indicator indicates that the shot is not the candidate for a close-up shot.

* * * * *